Patented Jan. 31, 1933

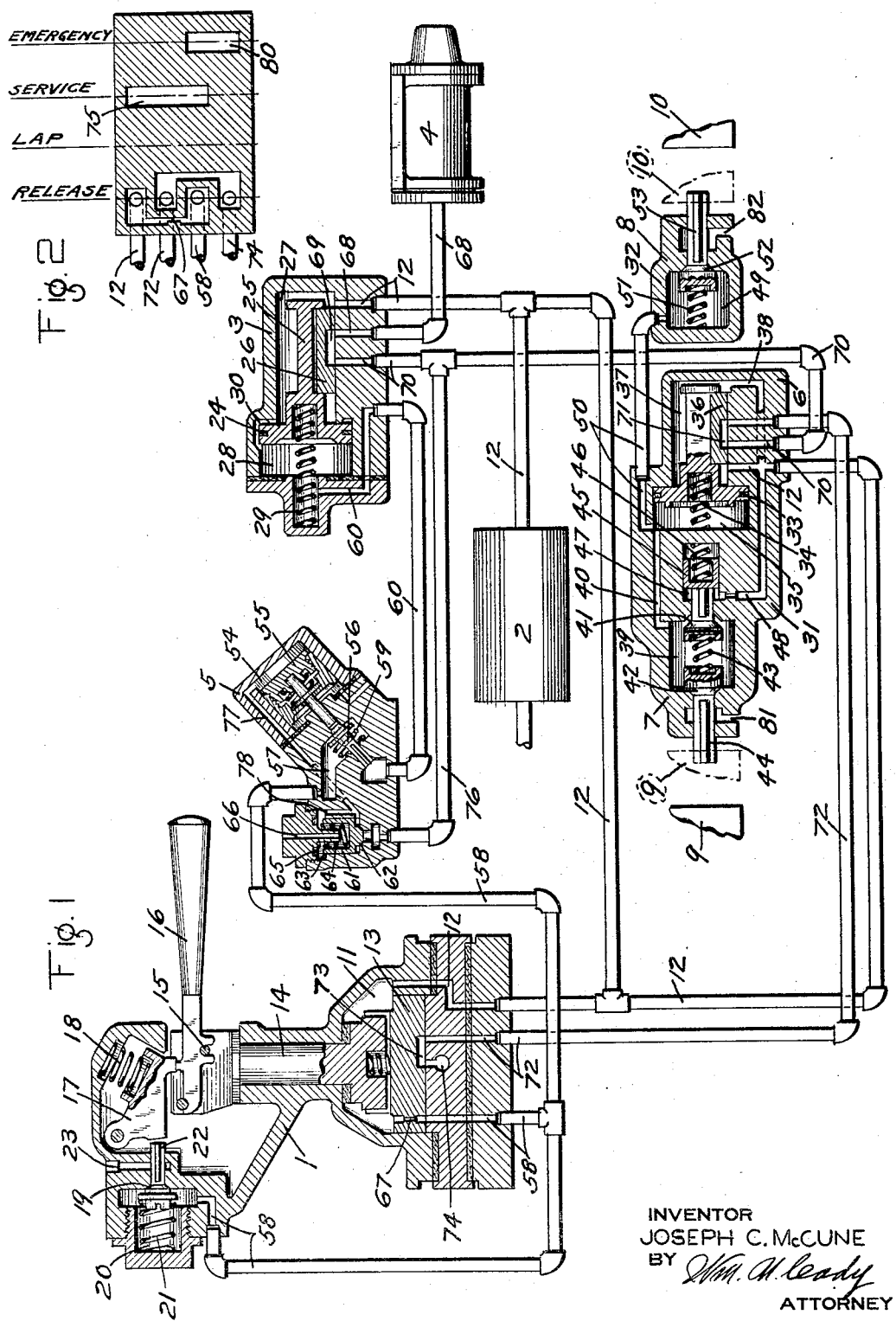

1,895,474

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

SAFETY CAR EQUIPMENT

Application filed January 2, 1930. Serial No. 417,873.

This invention relates to fluid pressure brakes and more particularly to safety car control equipment.

The principal object of my invention is to provide an improved safety car control equipment having means operative upon the opening of a car door for effecting an application of the brakes and for preventing the release of the brakes while the car door is open.

Another object of my invention is to provide an improved safety car control equipment having a brake valve device operative to initiate an emergency application of the brakes when the operator removes his hand from the operating lever of the brake valve device and having means interposed in the emergency pipe for preventing such an emergency application of the brakes from being effected in case the operator removes his hand from the operating lever after a straight air application of the brakes has been effected.

Other objects and advantages will appear in the following more detailed description of the invention.

In the accompanying drawing; Fig. 1 is a diagrammatic view, mainly in section, of a safety car control equipment embodying my invention; and Fig. 2 is a development view of the brake valve device.

As shown in the accompanying drawing, the safety car control equipment may comprise a brake valve device 1, a main reservoir 2, an emergency valve device 3, a brake cylinder 4, a cut-off valve device 5, a door interlock valve device 6, door controlled pilot valve devices 7 and 8, a front car door 9 and a rear car door 10.

The brake valve device may comprise a casing having a chamber 11 which is constantly connected to the main reservoir 2 through a passage and pipe 12 and contains a rotary valve 13 having an operating stem 14 which is provided with a fulcrum pin 15 on which an operating lever 16 is fulcrumed.

Arranged above the stem 14, and pivotally mounted in the casing, is an arm 17 which is subject to the pressure of a spring 18 and which is adapted to be engaged by the lever 16 at one side of the fulcrum pin 15 and which is adapted to control the operation of an emergency valve 19 contained in a valve chamber 20 in the casing, said valve being subject to the pressure of a spring 21 also contained in the chamber 20.

With an operator's hand on the outer end portion of the operating lever 16, the inner end portion thereof will be in engagement with the arm 17 and will maintain said arm in its extreme upper position against the pressure of the spring 18 out of engagement with the fluted stem 22 of the emergency valve 19 so that the pressure of the spring 21 maintains the emergency valve seated.

Should the operator remove his hand from the operating lever 16, the pressure of the spring 18 will cause the arm 17 to operate into engagement with the emergency valve stem 22 and, through the medium thereof, cause the emergency valve 19 to be unseated against the pressure of the spring 21, thus establishing communication from the emergency valve chamber 20 to the atmosphere past the unseated emergency valve and its fluted stem and through a passage 23.

The emergency valve device 3 may comprise a casing containing a piston 24 having a stem 25 adapted to operate a slide valve 26 contained in a chamber 27 at one side of the piston 24, which chamber is constantly connected to the main reservoir 2 through passage and pipe 12. At the other side of the piston 24 there is a chamber 28 containing a spring 29, to the pressure, of which, the piston 24 is subjected. With the emergency piston 24 in its extreme right hand position, as shown in Fig. 1, the chambers 27 and 28 are connected through a feed groove 30.

The door interlock valve device 6 and the pilot valve device 7 are combined in a single casing 31 and are positioned adjacent the car door 9 while the pilot valve device has a separate casing 32 and is positioned adjacent the car door 10.

The door interlock valve device may comprise a piston 33 which is subject to the pressure of a spring 34 contained in a chamber 35 at one side of the piston, said piston being adapted to operate a slide valve 36 contained in a chamber 37 at the other side of the piston, the chamber 37 being constantly connected to the main reservoir 2 through pipe 12 and a branch passage 38.

The casing 31 also has a chamber 39 formed therein constantly connected to the piston chamber 35 through a passage 40 and containing a supply valve 41 and a pilot valve 42. Also contained in the valve chamber 39 and interposed between and engaging the valves 41 and 42, is a spring 43, the pressure of which tends to maintain the valve 41 seated. The pilot valve 42 has a fluted stem 44 which extends through an opening in one end of the casing, and beyond the casing is adapted to be operatively engaged by the car door 9.

The supply valve 41 has a fluted stem which extends through an opening in a wall of the casing and is engaged by a plunger 45 which is subject to the pressure of a spring 46. The pressure of this spring is such that, when the pilot valve 42 is seated, it will cause the valve 41 to be unseated against the opposing pressure of the spring 43.

At the left hand side of the plunger 45 there is a chamber 47 which is constantly connected to the main reservoir 2 through pipe 12 and a restricted branch passage 48.

The casing 32 of the pilot valve device 8, has formed therein, a chamber 49 constantly connected to the piston chamber 35, in the door interlock valve device, through a passage and pipe 50. Contained in the chamber 49 and subject to the pressure of a spring 51, is a pilot valve 52 having a fluted stem 53 which extends through an opening in the casing 32, and beyond the casing is adapted to be operatively engaged by the car door 10. The pressure of the spring 51 tends to maintain the valve 52 seated.

The cut-off valve device 5 is interposed in the emergency connection between the brake valve device 1 and the emergency valve device 3 and is subject to the pressure of fluid supplied to the brake cylinder 4, in effecting a straight air application of the brakes, for preventing an emergency application should the operator remove his hand from the operating lever 16 of the brake valve device after a straight air application has been effected.

This cut-off valve device 5 may comprise a casing having a chamber 54 containing a piston 55 adapted to operate a cut-off valve 56 contained in a chamber 57 which is constantly connected to the emergency valve chamber 20 in the brake valve device 1 through a pipe and passage 58. Also contained in the valve chamber 57, is a spring 59, the pressure of which normally maintains the cut-off valve 56 unseated, establishing communication from the emergency valve chamber 20 in the brake valve device 1 to the emergency piston chamber 28 in the emergency valve device 3 by way of passage and pipe 58 cut-off valve chamber 57 past the unseated valve 56 and its fluted stem and through a pipe and passage 60.

Also contained in the casing of the cut-off valve device, is a valve piston 61 having valves 62 and 63, the valve 62 being normally maintained seated by the pressure of a spring 64 contained in a chamber 65 at one side of the valve piston, said chamber being constantly connected to the atmosphere through a passage 66 in a cap nut having screw-threaded connection with the casing.

The car doors 9 and 10 may be operated manually or by the use of any of the usual well known mechanisms.

Assuming now that the doors 9 and 10 are closed as shown in full lines in Fig. 1, the brake valve device in running and release position and the brake valve operating lever 16 depressed, fluid under pressure supplied to the main reservoir 2, flows therefrom to the slide valve chamber 27 in the emergency valve device through pipe and passage 12 and also flows to the rotary valve chamber 11 in the brake valve device through pipe and passage 12. Fluid under pressure thus supplied to the chamber 11, flows to the emergency piston chamber 28 through a restricted port 67 in the rotary valve 13, passage and pipe 58, valve chamber 57 in the cut-off valve device 5, past the unseated cut-off valve 56 and pipe and passage 60. Now when the fluid pressures on both sides of the emergency piston 24 are substantially equal the pressure of the spring 29 causes said piston to operate to shift the emergency slide valve to its release position as shown.

Fluid under pressure from the main reservoir 2 also flows to the slide valve chamber 37 in the door interlock valve device through pipe 12 and passage 38. From the pipe 12, fluid under pressure flows to the piston chamber 35 in the door interlock valve device through the restricted passage 48, chamber 47, past the unseated valve 41, through valve chamber 39 and passage 40, and when the fluid pressures on opposite sides of the piston 33 are substantially equal, the pressure of the spring 34 causes the piston to operate to shift the slide valve 36 to its release position as shown. From the piston chamber 35 fluid under pressure flows through passage and pipe 50 to the valve chamber 49 in the pilot valve device 8.

With both the emergency slide valve 26 and the door interlock slide valve 36 in release position, the brake cylinder 4 is connected to the atmosphere by way of a pipe and passage 68, a cavity 69 in the emergency slide valve 26, a passage and pipe 70, a cavity 71 in the slide valve 36, a passage and pipe 72, a cavity 73 in the rotary valve 13 of the brake valve device and a passage 74.

To effect a service application of the brakes, the brake valve device is operated to service position, in which, fluid under pressure from the rotary valve chamber 11 in the brake valve device, as supplied from the main reservoir 2, flows to the brake cylinder 4 through a port 75 in the rotary valve 13, passage and pipe 72, cavity 71 in the door interlock slide valve 36, passage and pipe 70, cavity 69 in the emergency slide valve 26 and passage and pipe 68.

Fluid under pressure from the pipe 70 flows to the inner seated area of the valve 62 of the cut-off valve device through a pipe 76 and when the pressure of fluid thus supplied is sufficient to overcome the opposing pressure of the spring 64, the valve piston will be caused to move upwardly unseating the valve 62 and seating the valve 63. With the valve 62 unseated, fluid under pressure from the pipe 76 flows to the piston chamber 54 by way of a passage 77, causing the piston 55 to operate downwardly and seat the cut-off valve 56 against the pressure of the spring 59, closing communication from the emergency piston chamber 28 to the brake valve device 1.

Now, since the cut-off valve 56 is seated, the operator may remove his hand from the operating lever 16 without causing an emergency application of the brakes to be effected.

To release the brakes, the brake valve device is operated to release position in which the passage 72 is connected to the atmosphere by way of cavity 73 in the rotary valve 13 of the brake valve device and passage 74 thus venting fluid under pressure from the brake cylinder. When the pressure of fluid, acting on the valve piston 61, has been reduced a predetermined amount, the pressure of the spring 64 causes the valve piston to operate to seat the valve 62 and unseat the valve 63 so that fluid under pressure remaining in the piston chamber 54 is vented to the atmosphere by way of passage 77, a branch passage 78 past the unseated valve 63 and through passage 66.

With the piston chamber 54 thus vented, the pressure of the spring 59 causes the piston 55 to operate upwardly unseating the cut-off valve 56, thus, again establishing communication from the pipe 58 to the pipe 60.

To effect an emergency application of the brakes, the brake valve device is operated to emergency position, in which, the emergency piston chamber 28 is connected to the atmosphere by way of passage and pipe 60, past the unseated cut-off valve 56, through the cut-off valve chamber 57, pipe and passage 58, a cavity 80 in the rotary valve 13 and passage 74.

With the emergency piston chamber thus vented, the pressure of fluid in the emergency slide valve chamber 27 causes the emergency piston 24 to operate to its extreme left hand or emergency position in which the end of the slide valve 26 uncovers the passage 68 so that fluid under pressure flows therethrough to the brake cylinder.

To release an emergency application of the brakes the brake valve device is operated to running and release position, in which, fluid under pressure is again supplied to the emergency piston chamber 28 by way of pipe 58, cut-off valve device 5 and pipe and passage 60. Now, when the pressure of fluid in chamber 28 together with the pressure of the spring 29, acting on one side of the emergency piston 24 is slightly greater than the pressure of fluid in the slide valve chamber 27 the piston will operate to shift the slide valve to its release position, in which position, fluid under pressure will be released from the brake cylinder in the same manner described in connection with the release of the brakes after a service application.

Should the operator remove his hand from the operating lever 16 of the brake valve device at any time the pressure of the spring 18 causes the arm 17 to operate to unseat the emergency valve 19 against the pressure of the spring so that fluid under pressure from the pipe 58 is vented to the atmosphere through the emergency valve chamber 20 in the brake valve device, past the unseated valve 19 and its fluted stem 22 and through passage 23. Now, if the cut-off valve is unseated as shown in Fig. 1, fluid under pressure is vented from the emergency piston chamber 28 to the atmosphere and the emergency valve device is caused to operate to effect an emergency application of the brakes.

When the operating lever 16 is again depressed, the arm 17 of the brake valve device is operated out of engagement with the valve stem 22 thus permitting the pressure of the spring 21 to seat the valve 19. With this valve seated, fluid under pressure supplied to the pipe 58 flows to the emergency piston chamber 28 causing the piston to operate to return the emergency slide valve 26 to its release position as before described.

If, when the car is brought to a stop, the car door 9 is operated toward its open position, said door will engage the stem 44 of the pilot valve 42 and cause said valve to be unseated against the pressure of the spring 43. The unseating of the valve 42 causes the pressure of the spring 43 on the valve 41, of the door interlock valve device, to be increased sufficiently that it will overcome the pressure of the spring 46 and will thus cause the valve 41 to seat closing off the supply of fluid under pressure to the valve chamber 39.

With the pilot valve 41 unseated, fluid under pressure from the piston chamber 35 is vented to the atmosphere by way of passage 40, valve chamber 39, past the unseated pilot valve and its fluted stem and through a passage 81. Fluid under pressure in the slide valve chamber 37 now causes the piston 33 to operate, against the pressure of the spring 34, to shift the slide valve 36 to its extreme left hand position, in which, the communication of the passages 70 and 72 with each other is closed off and in which the slide valve cavity 71 connects the passage 12 and passage 70 supplying fluid under pressure from the valve chamber 11 in the brake valve device 1 to the brake cylinder 4.

If the brake valve device should be operated to release position while the door 9 is open, the release of the brakes cannot be effected, since the passage 72 is blanked and fluid under pressure is supplied to the brake cylinder through the pipe and passage 12, cavity 71 in the slide valve 36, passage and pipe 70, cavity 69 in the emergency slide valve 26 and passage and pipe 68.

When the door 9 is operated to its closed position, the pressure of the spring 43 causes the pilot valve 42 to seat and the pressure of the spring 46 causes the valve 41 to unseat. With the valve 42 seated, the atmospheric communication from the piston chamber 35 is closed off and with the valve 41 unseated, fluid under pressure is again supplied from the main reservoir 2 to this piston chamber by way of pipe 12, passage 48 in the door interlock valve device 6, chamber 47, valve chamber 39 in the pilot valve device 7 and passage 40. When the pressure of fluid in the piston chamber 35 is substantially equal to the pressure of fluid in the slide valve chamber 37, the pressure of the spring 34 causes the piston 33 to operate to its extreme right hand position in which communication is again established from the passage 70 leading to the brake cylinder and the passage 70 leading to the brake valve device 1.

Should the brake valve device 1 be in running and release position or be operated to such position after the door is closed the release of the brakes will be effected in the same manner as after a service application.

Should the door 10 be opened, the pilot valve 52 will be unseated, and fluid under pressure in the piston chamber 35 is vented to the atmosphere through passage and pipe 50, valve chamber 49, past the unseated pilot valve 52 and its fluted stem 53 and through a passage 82. With the piston chamber 35 thus connected to atmosphere the door interlock valve device will operate to lap the passage 72 and to connect the passages 12 and 70, as has been described in connection with the unseating of the pilot valve 42. It will be noted however, that when the pilot valve 52 is unseated the valve 41 of the door interlock valve device remains unseated and fluid under pressure is supplied to the piston chamber 35 at such a slow rate that there will be no build up of pressure in this chamber so that the operation of the piston 33 will not be affected.

When the door 10 is closed the pressure of the spring 51 causes the pilot valve 52 to seat, after which the operation of the door interlock valve device to release position will be the same as before described.

Should the car be in motion and either door operated toward its open position, the door interlock valve device will operate as before described to supply fluid under pressure from the pipe 12 to the brake cylinder through passage and pipe 70, cavity 69 in the emergency slide valve 26 and passage and pipe 68, thus automatically initiating an emergency application of the brakes and rendering the brake valve device 1 ineffective to control the brakes until such time as the door is closed.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a fluid pressure brake equipment for a car, of a brake cylinder, a brake valve device operative to normally supply and release fluid under pressure to and from the brake cylinder, a door for the car and means operated by said door as the door is operated from its closed position for effecting an application of the brakes and for rendering the brake valve device ineffective to release fluid under pressure from the brake cylinder while said door is open.

2. The combination with a fluid pressure brake equipment for a car, of a brake cylinder, a brake valve device operative to normally supply and release fluid under pressure to and from the brake cylinder, a door for the car and means operated by said door as the door is operated from its closed position for effecting an application of the brakes and for rendering the brake valve device ineffective to release fluid under pressure from the brake cylinder while said door is open, said means being operative upon the closing of said door for rendering said brake valve device effective to control the release of fluid under pressure from the brake cylinder when the door is closed.

3. The combination with a fluid pressure brake equipment for a car, of a brake cylinder, a brake valve device operative to normally supply and release fluid under pressure to and from the brake cylinder, a door for the car, and means normally establishing communication through which fluid under pressure supplied and released to and from the brake cylinder flows, and operative by said door when the door is operated toward its open position for closing said communication and for supplying fluid under pressure to the brake cylinder.

4. The combination with a fluid pressure brake equipment for a car, of a brake cylinder, a brake valve device operative to normally supply and release fluid under pressure to and from the brake cylinder, a door for the car, and means normally establishing communication through which fluid under pressure supplied and released to and from the brake cylinder flows, and operative by said door when the door is operated towards its open position for closing said communication and for supplying fluid under pressure to the brake cylinder, said means being operative upon the closing of the door for reestablishing said communication.

5. The combination with a fluid pressure brake equipment for a car, of a brake cylinder, a brake valve device operative to normally supply and release fluid under pressure to and from the brake cylinder, valve means normally establishing communication through which fluid under pressure is supplied to and released from the brake cylinder and operative to close off said communication and to supply fluid under pressure to the brake cylinder, a door for the car, and a valve device operated by said door when the door is operated toward its open position for controlling the operation of said valve means.

6. In a fluid pressure brake for a car, the combination with a brake cylinder, of means establishing communication through which fluid under pressure is supplied and released to and from the brake cylinder and operative for closing said communication and for establishing another communication through which fluid under pressure is supplied to the brake cylinder, a door for the car, and a valve device operated by said door when the door is moved toward its open position for controlling the operation of said means.

7. In a fluid pressure brake for a car, the combination with a brake cylinder, of a valve normally establishing communication through which fluid under pressure is supplied and released to and from the brake cylinder, a piston subject to the pressure of a spring for maintaining said valve in position to establish said communication and operative upon a reduction of the pressure of fluid on one side of said piston for operating said valve to close said communication and for supplying fluid under pressure to the brake cylinder, a door for the car, and means operated by said door when the door is operated toward its open position for reducing the pressure of fluid on said side of the piston.

8. In a fluid pressure brake for a car, the combination with a brake cylinder, of a valve normally establishing communication through which fluid under pressure is supplied and released to and from the brake cylinder, a piston subject to the pressure of fluid and a spring for maintaining said valve in position to establish said communication and operative upon a reduction in the pressure of fluid on one side of said piston for operating said valve to close said communication and for supplying fluid under pressure to the brake cylinder and operative upon an increase in the pressure of fluid at said side of the piston to reestablish said communication, a door for the car, and means operated by said door for controlling the supply and release of fluid under pressure to and from the side of said piston.

9. In a fluid pressure brake for a car, the combination with a brake cylinder, of a valve device comprising a casing having a piston chamber and a valve chamber normally charged with fluid under pressure, a valve in said valve chamber normally establishing communication through which fluid under pressure is supplied and released to and from the brake cylinder, a piston in said piston chamber subject to the pressures of fluid in the piston chamber and valve chamber for maintaining said valve in position to establish said communication and operative upon a reduction of the pressure of fluid in said piston chamber for operating said valve to close said communication and for supplying fluid under pressure from said valve chamber to the brake cylinder, a door for the car, and means operated by the door when the door is operated toward its open position for reducing the pressure of fluid in said piston chamber.

10. In a fluid pressure brake for a car, the combination with a brake cylinder, of a valve device comprising a casing having a piston chamber and a valve chamber normally charged with fluid under pressure, a valve in said valve chamber normally establishing communication through which fluid under pressure is supplied and released to and from the brake cylinder, a piston in said piston chamber subject to the pressures of fluid in the piston chamber and valve chamber for maintaining said valve in position to establish said communication and operative upon a reduction of the pressure of fluid in said piston chamber for operating said valve to close said communication and for supplying fluid under pressure from said valve chamber to the brake cylinder, and operative upon the build up of the pressure of fluid in said piston chamber for reestablishing said communication, a door for the car, and means controlled by the door for controlling the pressure of fluid in said piston chamber.

11. In a fluid pressure brake for a car, the combination with a brake cylinder, of a valve device comprising a casing having a piston chamber and a valve chamber normally charged with fluid under pressure, a valve in said valve chamber normally establishing communication through which fluid under pressure is supplied and released to and from the brake cylinder, a piston in said piston chamber subject to the pressures of fluid in the piston chamber and valve chamber for maintaining said valve in position to establish said communication and operative upon a reduction of the pressure of fluid in said piston chamber for operating said valve to close said communication and for supplying fluid under pressure from said valve chamber to the brake cylinder, and operative upon the build up of the pressure of fluid in said piston chamber for reestablishing said communication, a door for the car, and a pilot valve operated by said door when the door is operated from its closed position for reducing the pressure of fluid in said piston chamber, and operated upon the closing of said door for permitting the pressure of fluid to build up in said piston chamber.

12. In a fluid pressure brake, the combination with a brake cylinder and a brake valve device operative to release fluid from the brake cylinder, of an application valve device operative to supply fluid under pressure to the brake cylinder, and a car door controlled valve device also operative to supply fluid under pressure to the brake cylinder, said valve devices controlling communication through which fluid under pressure is released from the brake cylinder by operation of said brake valve device.

13. In a fluid pressure brake, the combination with a brake cylinder and a brake valve device operative to release fluid from the brake cylinder, of an emergency valve device operative to supply fluid under pressure to the brake cylinder, and a car door controlled valve device also operative to supply fluid under pressure to the brake cylinder, said valve devices controlling communication through which fluid under pressure is released from the brake cylinder by operation of said brake valve device.

14. In a fluid pressure brake, the combination with a brake cylinder and a brake valve device operative to release fluid from the brake cylinder, of an application valve device operative to supply fluid under pressure to the brake cylinder, a car door, and a valve device operative upon the opening of said door to supply fluid under pressure to the brake cylinder, said valve devices controlling communication through which fluid under pressure is released from the brake cylinder by operation of the brake valve device.

15. In a fluid pressure brake, the combination with a brake cylinder and a brake valve device operative to release fluid from the brake cylinder, of an application valve device operative to supply fluid under pressure to the brake cylinder, a car door, and a valve device operative upon the opening of said door to supply fluid under pressure to the brake cylinder, said valve devices, when the door is closed, establishing communication through which fluid under pressure is released from the brake cylinder by operation of the brake valve device.

16. In a fluid pressure brake, the combination with a brake cylinder and a brake valve device operative to supply fluid under pressure to the brake cylinder and operative to release fluid under pressure from the brake cylinder, of an application valve operative to supply fluid under pressure to the brake cylinder, a car door, means operated upon the opening of said door to supply fluid under pressure to the brake cylinder, said application valve device and means establishing communication through which fluid under pressure is supplied to and released from the brake cylinder by operation of the brake valve device.

In testimony whereof I have hereunto set my hand, this 31st day of December, 1929.

JOSEPH C. McCUNE.